(12) United States Patent
Ichihara (10) Patent No.: US 6,275,558 B1
(45) Date of Patent: Aug. 14, 2001

(54) CIRCUIT AND METHOD FOR ARBITRARILY SHIFTING M-SEQUENCE

(75) Inventor: Masaki Ichihara, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/071,708

(22) Filed: May 1, 1998

(30) Foreign Application Priority Data

May 6, 1997 (JP) .................................. 9-115784

(51) Int. Cl.$^7$ ............................................. H04J 13/02
(52) U.S. Cl. .............................................. 377/64; 377/69
(58) Field of Search .................. 377/64, 67, 69, 377/75, 76, 77, 78; 375/152

(56) References Cited

U.S. PATENT DOCUMENTS 6,061,417  5/2000  Kelem ........................ 377/26
6,181,733  1/2001  Shinde ....................... 375/152

FOREIGN PATENT DOCUMENTS 129444    6/1989 (JP) .
131815    6/1989 (JP) .
8181679   7/1996 (JP) .

Primary Examiner—Tuan T. Lam
(74) Attorney, Agent, or Firm—Ostrolenk, Faber, Gerb & Soffen, LLP (57) ABSTRACT

A circuit, which shifts an M-sequence code with an arbitrary number of bits, is realized by a small circuit scale. D-type flip-flops 1–6 form a shift register for generating an M-sequence and having outputs $d_0$–$d_5$ of respective stages, to which $2^5$ bit shift inserting circuit 10 is connected in the manner of receiving the outputs $d_0$–$d_5$ as respective inputs and of outputting outputs $O_0$–$O_5$, to which $2^4$ bit shift inserting circuit 11 is connected in the manner of receiving the outputs $O_0$–$O_5$ as respective inputs. In the same manner, a $2^3$ bit shift inserting circuit 12, a $2^2$ bit shift inserting circuit 13, a $2^1$ bit shift inserting circuit 14, and a $2^0$ bit shift inserting circuit 15 are sequentially connected with one another. Each of bit shift inserting circuits 10–15 respectively shifts a predetermined bit when control signals $b_5$–$b_0$ are "1", and does not shift a bit when "0" so as to output an input as it is. Therefore, it is possible to obtain an arbitrary bit shift.

13 Claims, 11 Drawing Sheets

CIRCUIT AND METHOD FOR ARBITRARILY SHIFTING M-SEQUENCE

BACKGROUND OF THE INVENTION

Figure 9:
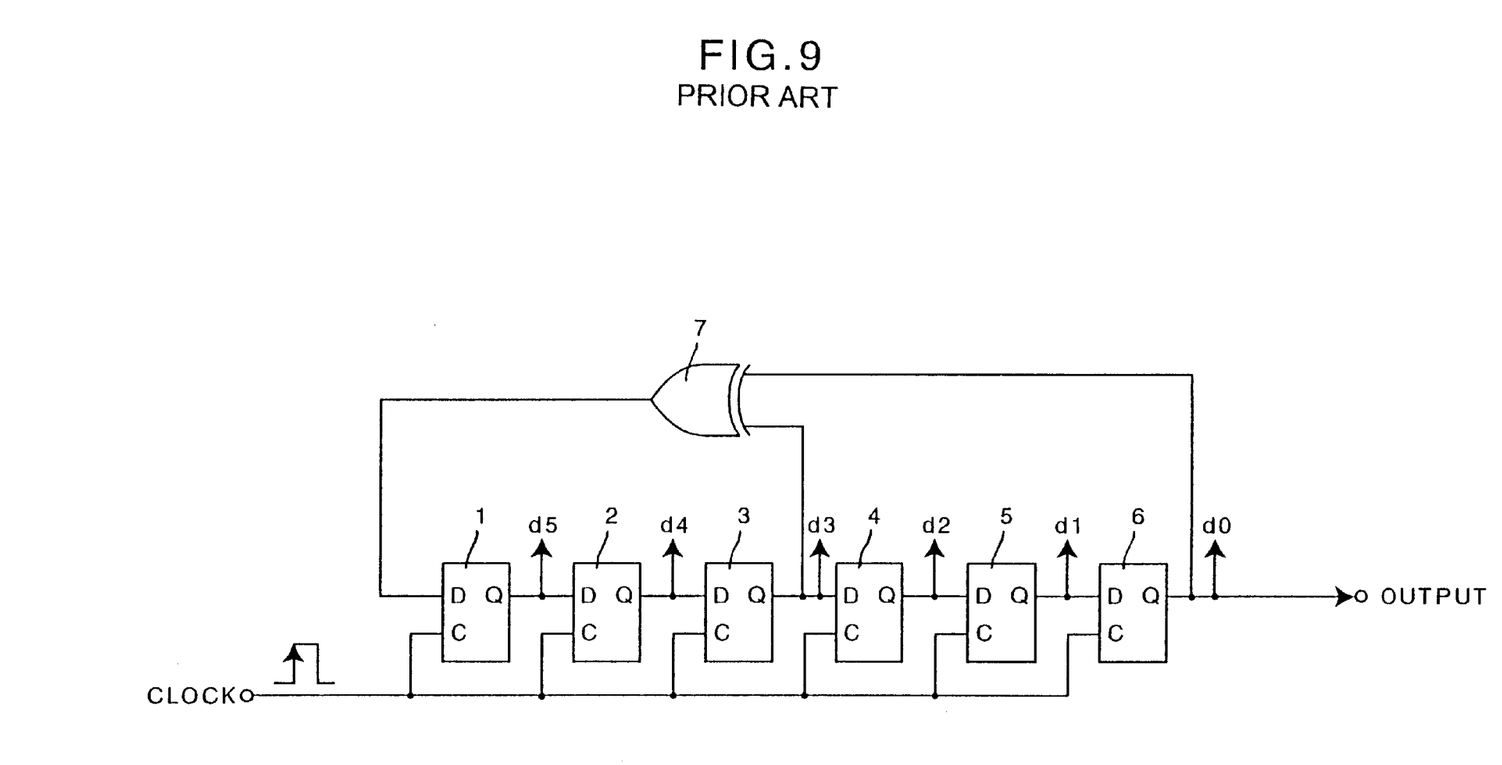
FIG. 9 is a block diagram showing an example of six stage PN generating circuit.

The present invention relates to a circuit for generating an M-sequence code (Maximum Length Code) which is used as a spread code such in a frequency spread communication (Spread Spectrum Communication), and particularly to the circuit for shifting the M-sequence code with an arbitrary bit. An M-sequence is a kind of PN (Pseudorandom Noise), which can be easily generated by a shift register comprising D-type flip-flops 1–6 having a feedback circuit using an exclusive OR circuit 7 as shown in FIG. 9, for example. Accordingly, the M-sequence code is often used as a spread code in a spread spectrum communication.

In the spread spectrum communication, it is necessary for a reception side to generate an inverse spread code which synchronizes and coincides with the spread code, so that it is necessary to have a synchronization by arbitrarily shifting the M-sequence which is used in spreading.

There has been known a conventional circuit disclosed in JP-A-8-181679 (1996), which is one of conventional methods for arbitrarily shifting the M-sequence. The conventional technology is shown in FIG. 10.

Figure 10:
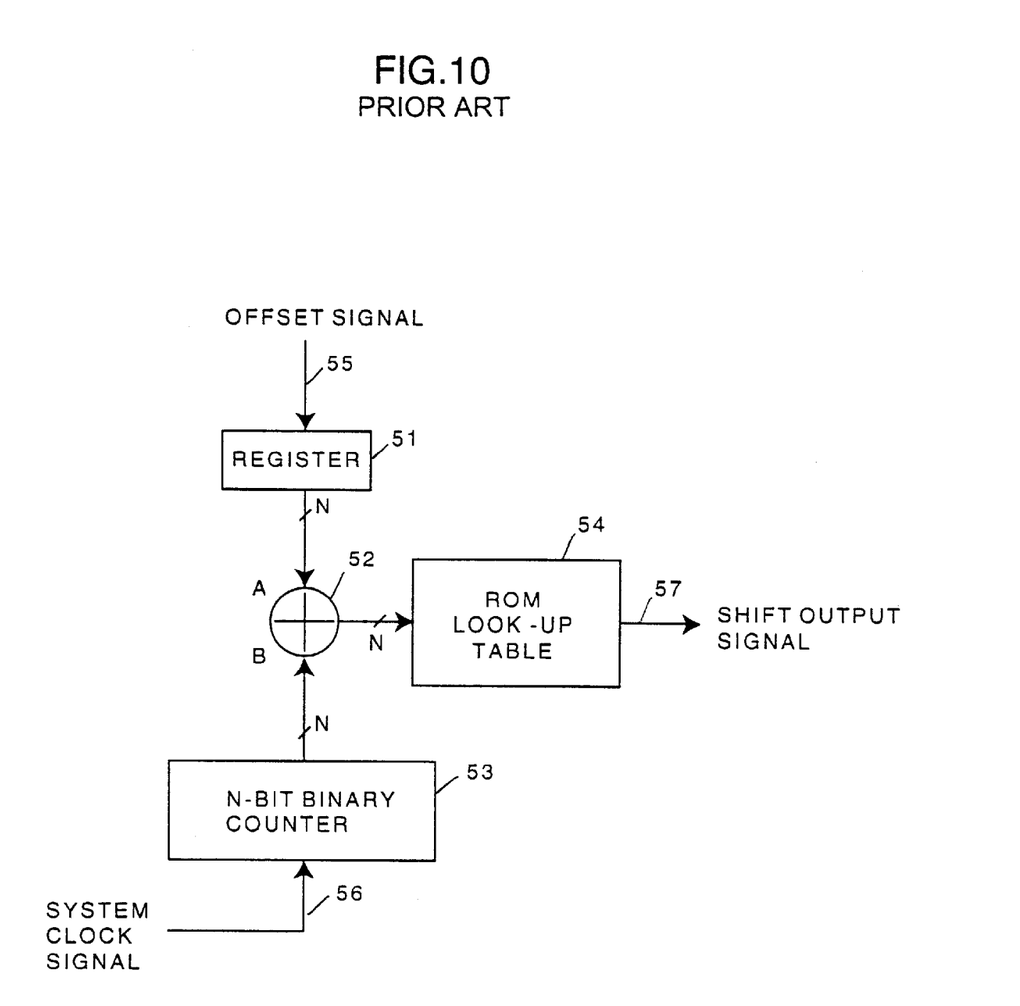
FIG. 10 is a block diagram showing the first conventional example.

In FIG. 10, entire data of the M-sequence or PN-sequence are stored in a ROM look-up table 54. An address added to the ROM 54 includes a value of which an N-bit binary counter 53 counts a system clock signal 56, and a value of which an adder 52 adds an offset signal 55 which is held in a register 51 based on an external designation. Since the address increases one by one at every one count of the clock signal 56 by the counter 53, the ROM 54 outputs in the order a PN-sequence 57 stored therein.

Further, the offset signal 55 is written in the register 51 to increase the address with its amount so as to output a shift output signal as the PN-sequence 57, thereby enabling to arbitrarily shift the PN-sequence.

By the way, in the conventional example described above, it is necessary to store entire of the M-sequence or PN-sequence in the ROM, and it is no problem if a stage number of the M-sequence is small.

Figure 11:
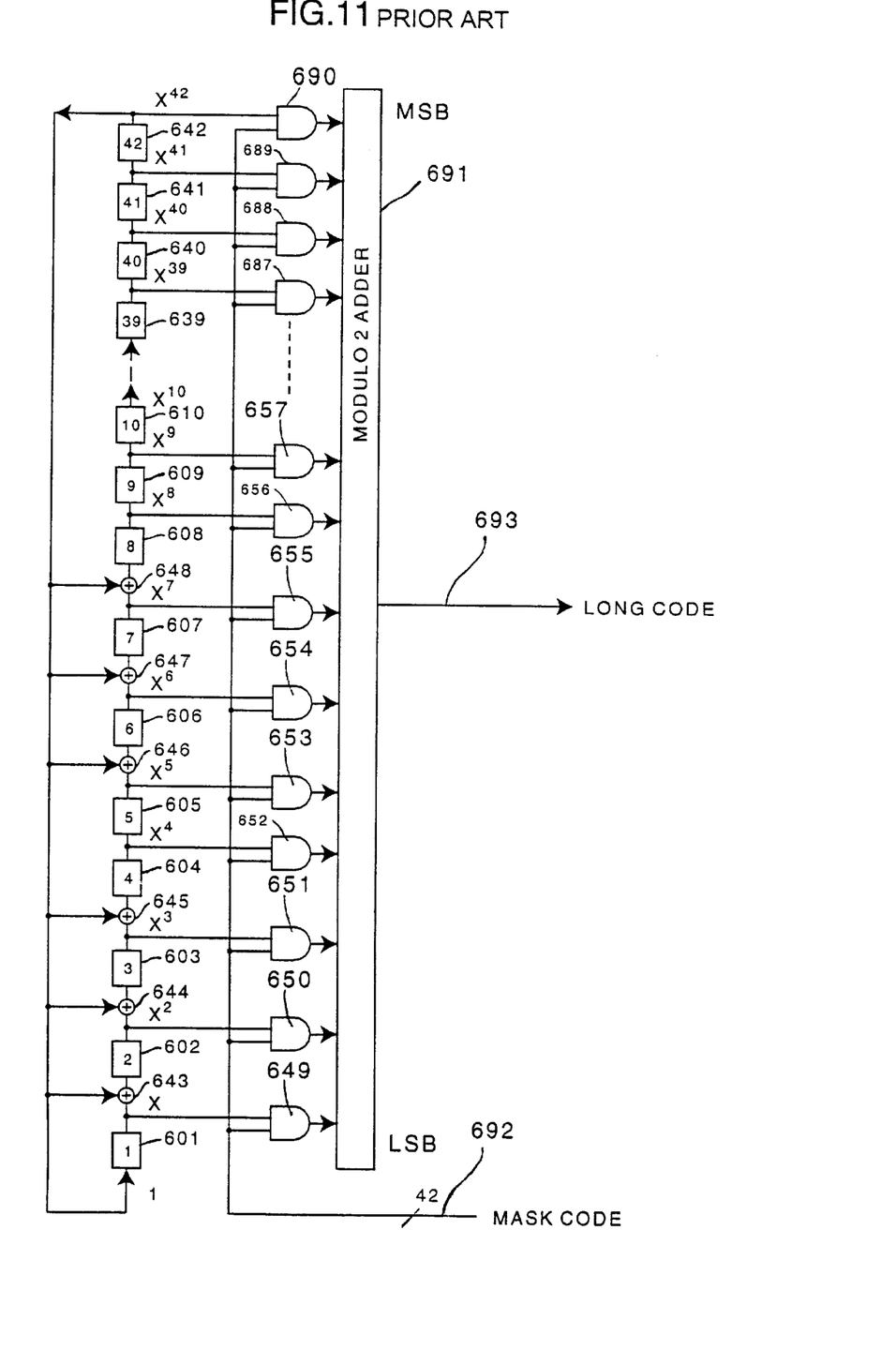
FIG. 11 is a block diagram showing the second conventional example.

However, in the case of the M-sequence having 42 stages such in FIG. 11, for example, a cycle is $2^{42}-1$ bit which corresponds to about 4000 Gbit. There has not been a ROM for holding such large data, which is impractical idea at the present time.

Further, FIG. 11 is a circuit diagram showing a circuit for generating a long code as a kind of a spread code, which is used in the IS95 system of CDMA (Code Division Multiple Access) in U.S.A. The circuit uses an M-sequence of a forty-second stage, and comprises registers 601–642, adders 643–648, AND gate circuits 649–690, a modulo adder 691, thereby obtaining a long code 693 of which a bit is random shifted corresponding to a value of a mask code 692 which is inputted in the AND gate circuits 649–690.

The mask code 692 is used as a cipher key, and it is necessary that mask codes are the same as each other in the transmission side and the reception side.

Accordingly, there has been no original purpose to shift the M-sequence with an arbitrary number of bits by using the mask code. Therefore, it is necessary that a mask code corresponding to a shift amount thereof is previously obtained and stored for shifting the M-sequence. Accordingly, it is difficult to instantaneously shift it with an arbitrary number of bits.

SUMMARY OF THE INVENTION

The objective of the present invention is to solve the above-mentioned tasks.

Moreover, the objective of the invention is to provide a technology for arbitrarily shifting an M-sequence, the circuit capable of generating the M-sequence, which is shifted with an arbitrary number of bits by a small circuit scale.

The objective of the present invention is achieved by a circuit for arbitrarily shifting an M-sequence, which comprises shift registers of N-stage and for generating an M-sequence, a plurality of two to the several power bits shift inserting circuits connected in series between an output N-bit of each stage of the shift register and the final output N-bit.

Furthermore, each of the two to the several power bit shift inserting circuits, comprises a two to several power bit shifting circuit for shifting an N-bit input signal with two to several power bits, and a data selector for outputting after changing over the N-bit input signal and an N-bit signal outputted from the two to several power bit shifting circuit corresponding to an external control signal, so as to output an N-bit output signal.

Moreover, the two to several power bit shift inserting circuit has an exponent of the power of two, which is an integral number of N from 0 to N−1.

Still furthermore, a circuit for arbitrarily shifting an M-sequence necessarily has only a two to several power bit shift inserting circuit which has a specific integral number from 0 to N−1 as an exponent of the power of two.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

There will be described an embodiment according to the present invention.

There will be described first a principle of a bit shift of an M-sequence by using FIG. 1. Even though the register shown in FIG. 1 has six stages, the principles are the same as that having stages more than six.

Figure 1:
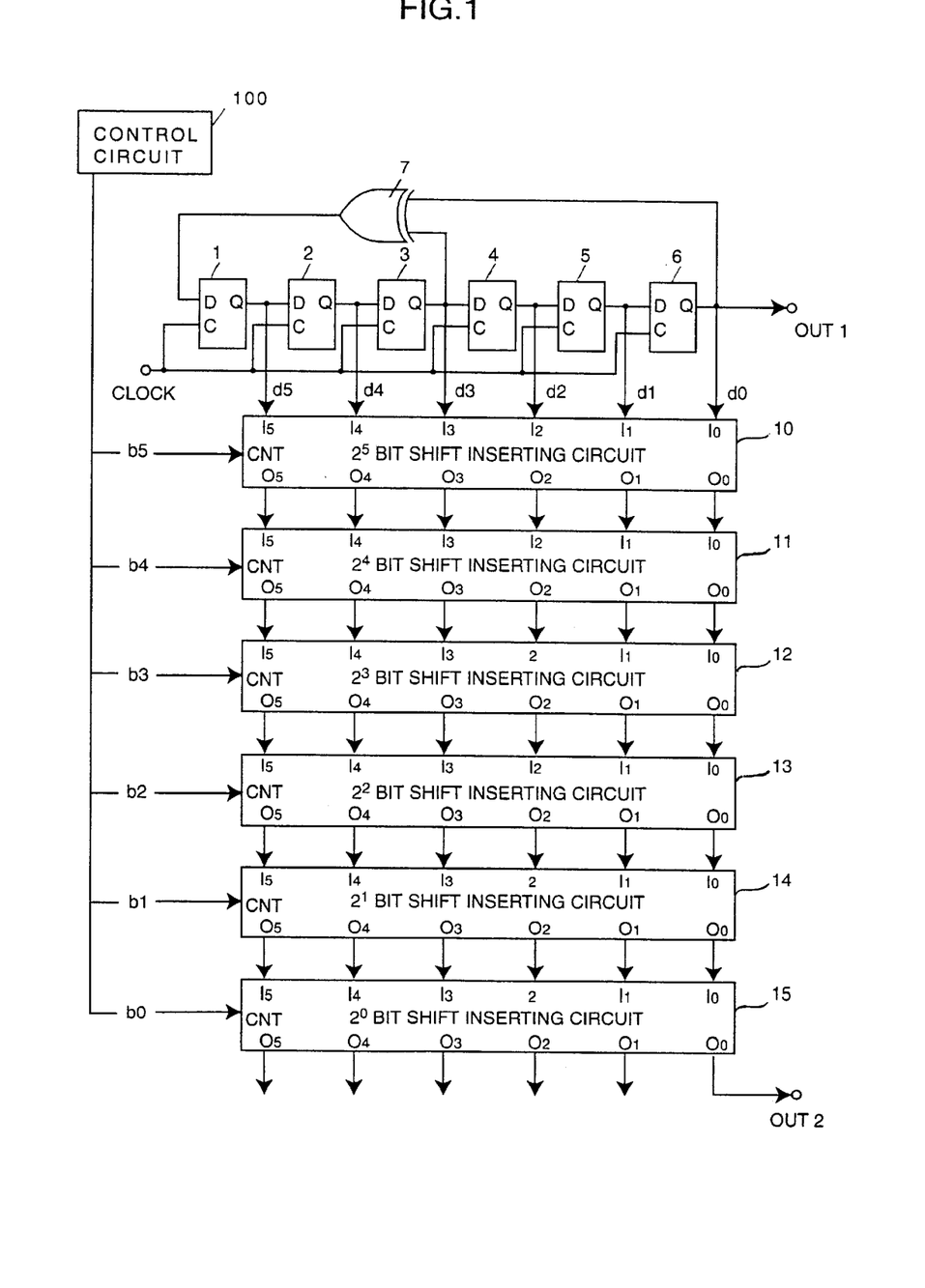
FIG. 1 is a block diagram showing a circuit for arbitrarily shifting an M-sequence according to an embodiment of the present invention.

It is assumed that each stage of in the register (which is constructed from D-type flip-flops 1–6) shown in FIG. 1, has values d0–d5 as shown in the figure. Values after one bit can be obtained by the present values d0–d5 according to the following equation (1).

$$\begin{pmatrix} d_0 \\ d_1 \\ d_2 \\ d_3 \\ d_4 \\ d_5 \end{pmatrix}_{n+1} = \begin{pmatrix} 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 1 & 0 & 0 \end{pmatrix} \begin{pmatrix} d_0 \\ d_1 \\ d_2 \\ d_3 \\ d_4 \\ d_5 \end{pmatrix}_n \quad (1)$$

where a product of the matrix operation is a logical product, a sum of the matrix operation is a logical sum, a suffix of "n" of a vector denotes a presence, and a suffix of "n+k" of a vector denotes a condition after shifted by k bits.

When the above-described matrix and vector are simplified, they can be represented by the equation as follows:

$$A = \begin{pmatrix} 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 1 & 0 & 0 \end{pmatrix}, \bar{d}_n = \begin{pmatrix} d_0 \\ d_1 \\ d_2 \\ d_3 \\ d_4 \\ d_5 \end{pmatrix} \quad (2)$$

If the condition can be represented as above-described equation, values after shifted with k bits can be represented by the following equation:

$$\bar{d}_{n+k} = A^k \cdot \bar{d}_n \quad (3)$$

A "k" can be represented by a power of two as follows:

$$k = \sum_{i=0}^{5} b_i \cdot 2^i \quad (b_i = 0 \text{ or } k) \quad (4)$$

Accordingly, the following equation can be obtained as a conclusion:

$$\overline{d_{n+k}} = \prod_{i=0}^{5} A^{b_i \cdot 2^i} \cdot \bar{d}_n \quad (b_i = 0 \text{ or } k) \quad (5)$$

Accordingly, on the basis of a matrix A which is shifted with k bits, a matrix of two to several power of the matrix A is previously obtained, and the obtained matrix is caused to be respectively operated with the original vector corresponding to a binary number representation bi of a value of k, thereby introducing the values of the register after shifted with k bit.

According to the above-described contents, the present invention can obtain an output shifted by k bits, in the manner of obtaining a product of two to several power of the matrix A, and of providing a shift circuit corresponding to an operation of the product, the shift circuit which operates the above operation when the binary number representation bi of k is "1", and operates by bypassing the above operation to d0–d5 when the representation bi is "0". This is the basis of the present invention.

The followings are showing the calculation of two to several power products of the matrix A in the M-sequence having six stages.

In the case of a large number of stages, the calculation method is the same as that of the six stages.

$$A^{2^0} = A = \begin{pmatrix} 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 1 & 0 & 0 \end{pmatrix},$$

$$A^{2^1} = A^{2^0} \cdot A^{2^0} = A^2 = \begin{pmatrix} 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 1 & 0 & 0 \\ 0 & 1 & 0 & 0 & 1 & 0 \end{pmatrix},$$

$$A^{2^2} = A^{2^1} \cdot A^{2^1} = A^4 = \begin{pmatrix} 0 & 0 & 0 & 0 & 1 & 0 \\ 0 & 0 & 0 & 0 & 0 & 1 \\ 1 & 0 & 0 & 1 & 0 & 0 \\ 0 & 1 & 0 & 0 & 1 & 0 \\ 0 & 0 & 1 & 0 & 0 & 1 \\ 1 & 0 & 0 & 0 & 0 & 0 \end{pmatrix},$$

$$A^{2^3} = A^{2^2} \cdot A^{2^2} = A^8 = \begin{pmatrix} 0 & 0 & 1 & 0 & 0 & 1 \\ 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \end{pmatrix},$$

$$A^{2^4} = A^{2^3} \cdot A^{2^3} = A^{16} = \begin{pmatrix} 0 & 1 & 0 & 0 & 1 & 0 \\ 0 & 0 & 1 & 0 & 0 & 1 \\ 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \end{pmatrix},$$

$$A^{2^5} = A^{2^4} \cdot A^{2^4} = A^{32} = \begin{pmatrix} 0 & 0 & 0 & 0 & 0 & 1 \\ 1 & 0 & 0 & 1 & 0 & 0 \\ 0 & 1 & 0 & 0 & 1 & 0 \\ 0 & 0 & 1 & 0 & 0 & 1 \\ 1 & 0 & 0 & 0 & 0 & 0 \\ 0 & 1 & 0 & 0 & 0 & 0 \end{pmatrix}$$

That is, the matrix of A to $2^0$ (two to zero power) power is a matrix that an M-sequence of six stages (six bits) is caused to be shifted with one bit. Further, the matrix of A to $2^1$ (two to the first power) power is a matrix that an M-sequence of six stages (six bits) is caused to be shifted with two bits. Further, the matrix of A to $2^2$ (two to the second power) power is a matrix that an M-sequence of six stages (six bits) is caused to be shifted with four bits. Further, the matrix of A to $2^3$ (two to the third power) power is a matrix that an M-sequence of six stages (six bits) is caused to be shifted with eight bits. Further, the matrix of A to $2^4$ (two to the fourth power) power is a matrix that an M-sequence of six stages (six bits) is caused to be shifted with sixteen bits. Further, the matrix of A to $2^5$ (two to the fifth power) power is a matrix that an M-sequence of six stages (six bits) is caused to be shifted with thirty-two bits.

It is possible to arbitrarily shift an M-sequence by means of a combination of these matrices (or determinants). For example, it will be supposed that an M-sequence of six stages (six bits) is caused to be shifted with five bits.

In the case of shifting the M-sequence with five bits, it is sufficient that one bit is shifted first, and then four bits are shifted. Accordingly, if the matrix of A to $2^0$ power and the matrix A to $2^2$ power are multiplied in the order to the M-sequence, it is possible to obtain an M-sequence in which five bits are shifted.

Next, there will be described in detail a shift circuit according to the preferred embodiment of the present invention with reference to the attached drawings.

FIG. 1 is a block diagram showing a configuration of a circuit for arbitrarily shifting an M-sequence according to one embodiment of the present invention.

The circuit of this embodiment comprises a plurality of D-type flip-flops 1–6 constituting a shift register for generating an M-sequence, an exclusive OR gate 7, a $2^5$ (two to the fifth power) bit shift inserting circuit 10 for inputting a plurality of outputs $d_0$, $d_1$, $d_2$, $d_3$, $d_4$ and $d_5$ which are outputted from the D-type flip-flops 6, 5, 4, 3, 2, 1, respectively, a $2^4$ (two to the fourth power) bit shift inserting circuit 11 for inputting an output of the $2^5$ bit shift inserting circuit 10, a $2^3$ (two to the third power) bit shift inserting circuit 12 for inputting an output of the $2^4$ bit shift inserting circuit 11, a $2^2$ (two to the second power) bit shift inserting circuit 13 for inputting an output of the $2^3$ bit shift inserting circuit 12, a $2^1$ (two to the first power) bit shift inserting circuit 14 for inputting an output of the $2^2$ bit shift inserting circuit 13, and a $2^0$ (two to the zero power) bit shift inserting circuit 15 for inputting an output of the $2^1$ bit shift inserting circuit 14. Respective bit shift inserting circuits 10–15 perform a predetermined bit shift when control signal $b_5$–$b_0$ are "1", and do not perform the bit shift when the signals are "0" to output an input as it is. By this, it is possible to obtain a shift of the bit as follows:

$$k = \sum_{i=0}^{5} b_i \cdot 2^i \qquad (6)$$

Here, there will be described a control signal.

The control signal is outputted from a control circuit 100. When the control circuit 100 receives an order for shifting with k bit(s), k is rewritten by a binary scale representation of six figures. For example, there is 000101 when k is five, and there is 100000 when k is 32, respectively. A number of the first figure is outputted by a control signal $b_0$, a number of the second figure is outputted by a control signal $b_1$, a number of the third figure is outputted by a control signal $b_2$, a number of the fourth figure is outputted by a control signal $b_3$, a number of the fifth figure is outputted by a control signal $b_4$, and a number of the sixth figure is outputted by a control signal $b_5$, respectively.

For example, when five bits are shifted, there is 000101 when five is represented by a binary scale. Accordingly, the control signal $b_0$ is "1", the control signal $b_1$ is "0", the control signal $b_2$ is "1", the control signal $b_3$ is "0", the control signal $b_4$ is "0", and the control signal $b_5$ is "0", respectively.

The bit shift inserting circuits 10–15 have the above-described operation when each of control signals is inputted.

In this case, the control signal $b_5$=0 is inputted into a $2^5$ bit shift inserting circuit 10, the control signal $b_4$=0 is inputted into a $2^4$ bit shift inserting circuit 11, the control signal $b_3$=0 is inputted into a $2^3$ bit shift inserting circuit 12, the control signal $b_2$=1 is inputted into a $2^2$ bit shift inserting circuit 13, the control signal $b_1$=0 is inputted into a $2^1$ bit shift inserting circuit 14, and the control signal $b_0$=1 is inputted into a $2^0$ bit shift inserting circuit 15, respectively.

The $2^5$-bit shift inserting circuit 10 does not shift a bit by the control signal, and outputs the input as it is. The $2^4$-bit shift inserting circuit 11 does not shift a bit in the output of the $2^5$-bit shift inserting circuit 10 by the control signal, and outputs the input as it is. The $2^3$-bit shift inserting circuit 12 does not shift a bit in the output of $2^4$-bit shift inserting circuit 11 by the control signal, and outputs the input as it is. The $2^2$-bit shift inserting circuit 13 outputs after shifting the output of the $2^3$-bit shift inserting circuit 12 with four bits by the control signal. The $2^1$-bit shift inserting circuit 14 does not shift a bit in the output of the $2^2$-bit shift inserting circuit 13 by the control signal, and outputs the input as it is. The $2^0$-bit shift inserting circuit 15 outputs after shifting the output of the $2^1$-bit shift inserting circuit 11 with one bit by the control signal.

Accordingly, a bit string outputted from the $2^0$-bit shift inserting circuit 15 is that the M-sequence outputted from the shift register has been shifted with five bits.

Figure 2:
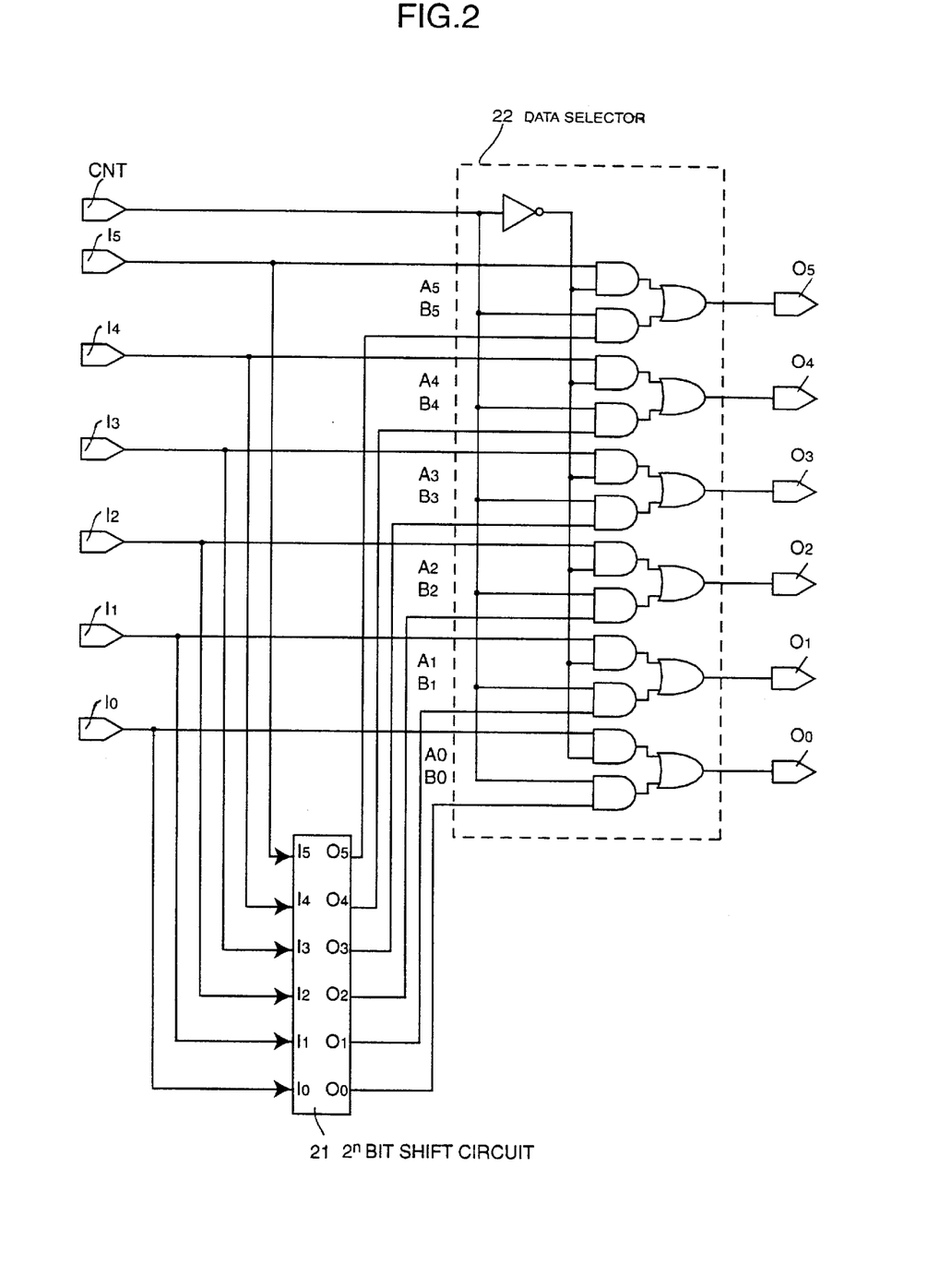
FIG. 2 is a block diagram showing the $2^5$ bit shift inserting circuit 10, the $2^4$ bit shift inserting circuit 11, the $2^3$ bit shift inserting circuit 12, the $2^2$ bit shift inserting circuit 13, the $2^1$ bit shift inserting circuit 14, and the $2^0$ bit shift inserting circuit 15.

FIG. 2 is a block diagram showing each of the $2^5$–$2^0$ bit shift inserting circuits 10–15 shown in FIG. 1.

Each of the $2^n$ bit shift inserting circuits (n=5, 4, . . . , and 0,) 10–15 comprises input terminals $I_0$, $I_1$, $I_2$, $I_3$, $I_4$, $I_5$, and CNT, a $2^n$ bit shift inserting circuit 21 for performing a predetermined bit shift with respect to a plurality of inputs $A_0$–$A_5$ of the input terminals $I_0$–$I_5$ so as to output a plurality of outputs $B_0$–$B_5$, and a data selector 22 for outputting the outputs $B_0$–$B_5$ when the input terminal CNT has a control signal being "1" and for alternatively outputting the inputs $A_0$–$A_5$ of the input terminals $I_0$–$I_5$ when the control signal b is "0", respectively from output terminals $O_0$–$O_5$.

FIG. 3, FIG. 4, FIG. 5, FIG. 6, FIG. 7 and FIG. 8 are block diagram respectively showing the $2^0$ bit shift circuit, the $2^1$ bit shift circuit, the $2^2$ bit shift circuit, the $2^3$ bit shift circuit, the $2^4$ bit shift circuit, and the $2^5$ bit shift circuit.

Figure 3:
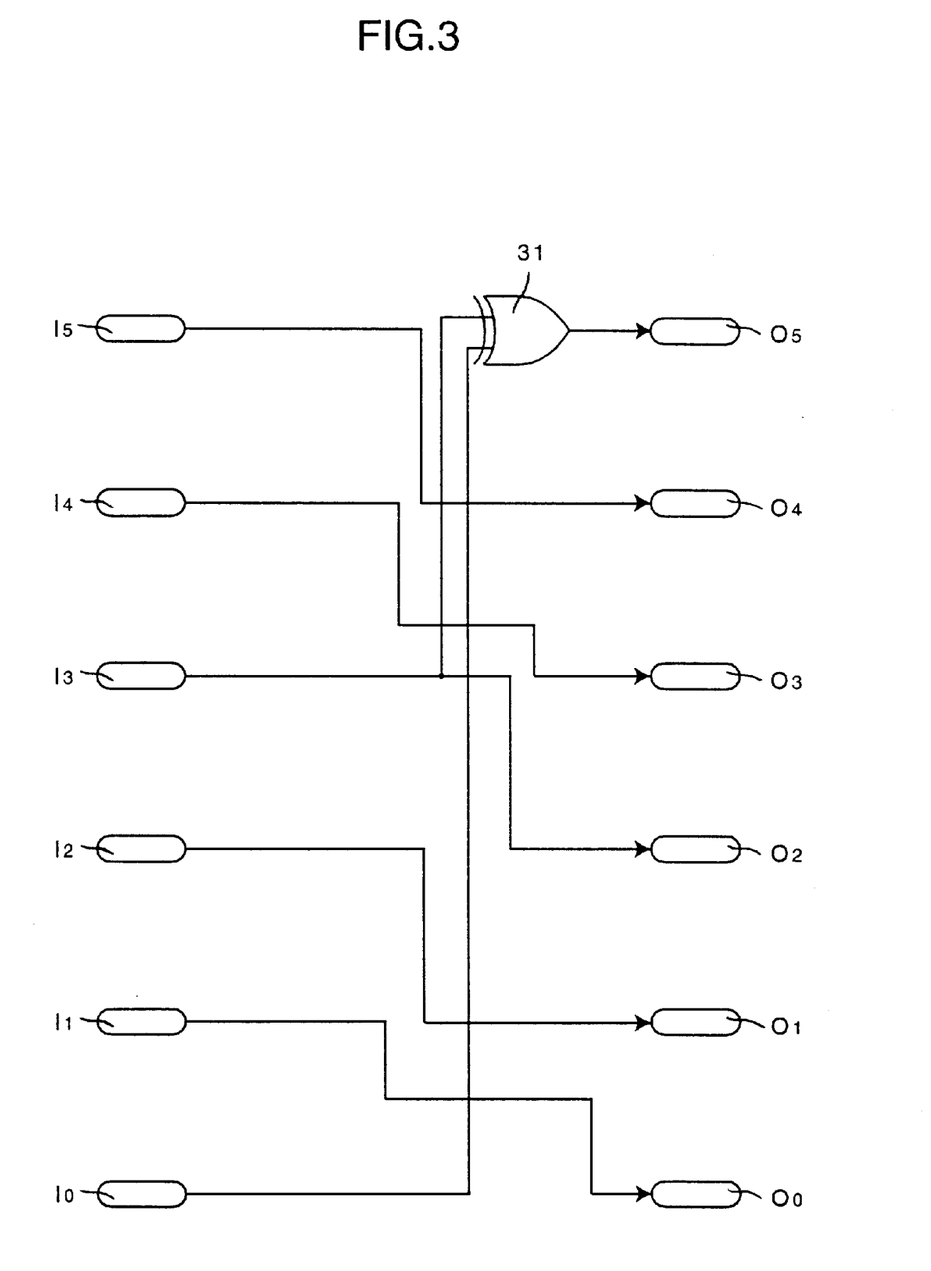
FIG. 3 is a block diagram showing the $2^0$ bit shift circuit.

The $2^0$ bit shift circuit has an exclusive OR circuit 31 for taking an exclusive OR of the input $A_0$ of the input terminal $I_0$ and the input $A_3$ of the input terminal $I_3$. The $2^0$ bit sift circuit outputs the inputs $A_1$, $A_2$, $A_3$, $A_4$ and $A_5$ of the input terminals $I_1$, $I_2$, $I_3$, $I_4$ and $I_5$ respectively to the output terminals $O_1$, $O_2$, $O_3$, $O_4$ and $O_5$, and outputs the output of the exclusive OR circuit 31 to the output terminal $O_5$.

Figure 4:
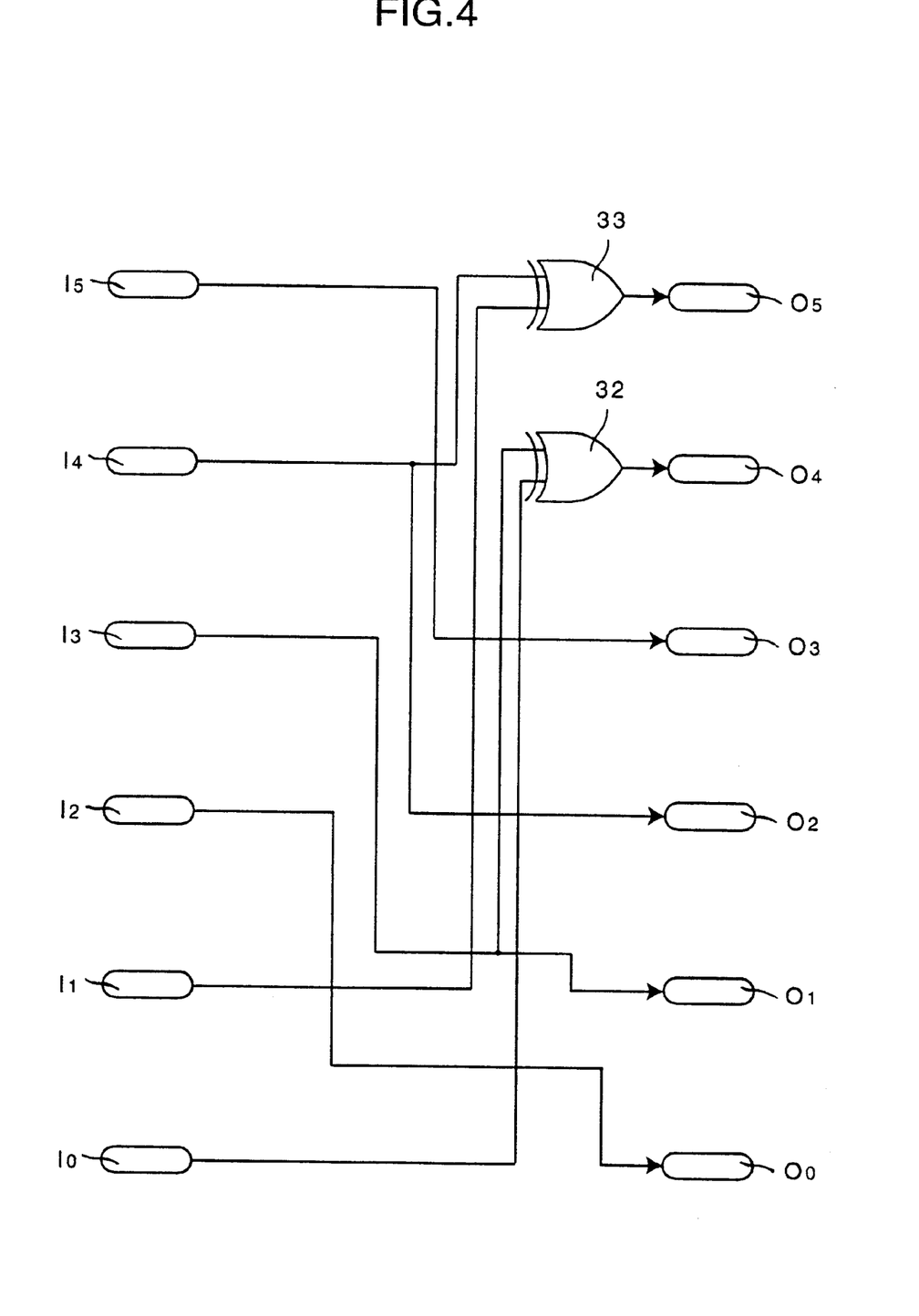
FIG. 4 is a block diagram showing the $2^1$ bit shift inserting circuit.

The $2^1$ bit shift circuit has an exclusive OR circuit 32 for taking an exclusive OR of the input $A_0$ of the input terminal $I_0$ and the input $A_3$ of the input terminal $I_3$, and an exclusive OR circuit 33 for taking an exclusive OR of the input $A_1$ of the input terminal $I_1$ and the input $A_4$ of the input terminal $I_4$. The $2^1$ bit sift circuit outputs the inputs $A_2$, $A_3$, $A_4$ and $A_5$ of the input terminals $I_2$, $I_3$, $I_4$ and $I_5$, respectively to the output terminals $O_0$, $O_1$, $O_2$, and $O_3$, and outputs the outputs of the exclusive OR circuits 32 and 33 to the output terminals $O_4$ and $O_5$.

Figure 5:
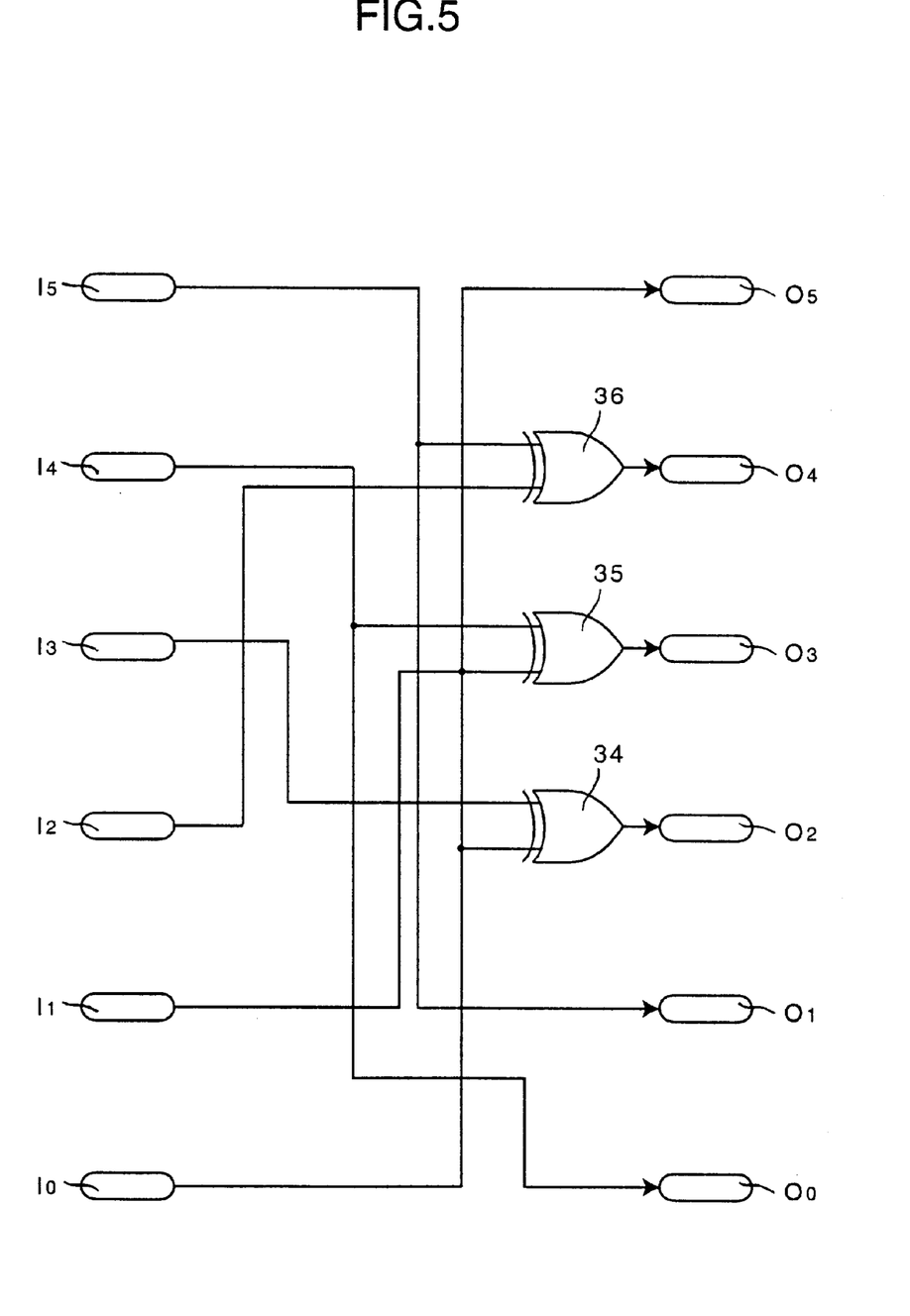
FIG. 5 is a block diagram showing the $2^2$ bit shift circuit.

The $2^2$ bit shift circuit has an exclusive OR circuit 34 for taking an exclusive OR of the input $A_0$ of the input terminal $I_0$ and the input $A_3$ of the input terminal $I_3$, an exclusive OR circuit 35 for taking an exclusive OR of the input $A_1$ of the input terminal $I_1$ and the input $A_4$ of the input terminal $I_4$, and an exclusive OR circuit 36 for taking an exclusive OR of the input $A_2$ of the input terminal $I_2$ and the input $A_5$ of the input terminal $I_5$. The $2^2$ bit sift circuit outputs the inputs $A_4$, $A_5$, and $A_0$ of the input terminals $I_4$, $I_5$ and $I_0$, respectively to the output terminals $O_0$, $O_1$ and $O_5$, and outputs the outputs of the exclusive OR circuits 34, 35 and 36 to the output terminals $O_2$, $O_3$ and $O_4$.

Figure 6:
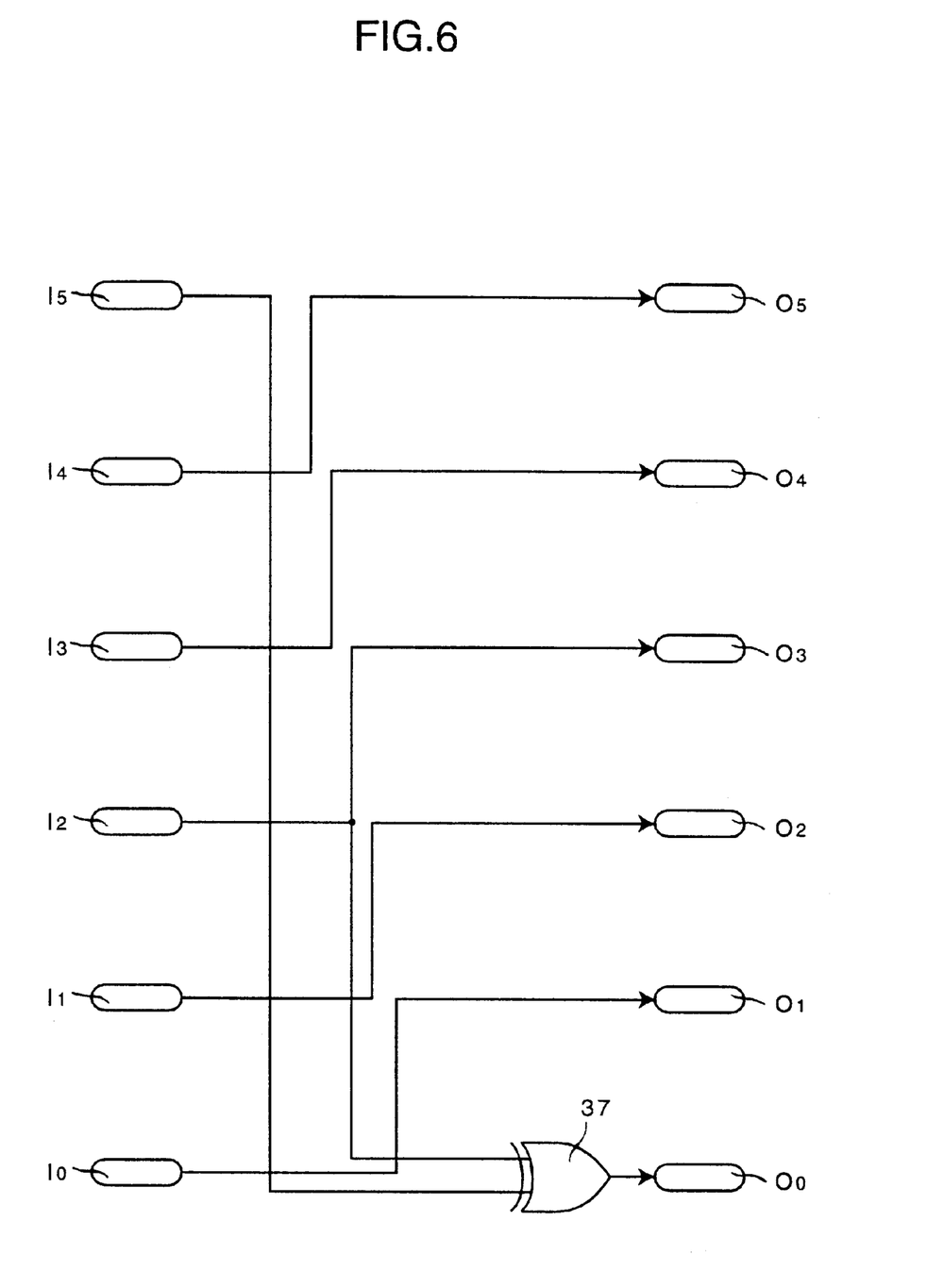
FIG. 6 is a block diagram showing the $2^3$ bit shift inserting circuit.

The $2^3$ bit shift circuit has an exclusive OR circuit 37 for taking an exclusive OR of the input $A_2$ of the input terminal $I_2$ and the input $A_5$ of the input terminal $I_5$. The $2^3$ bit sift circuit outputs an output of the exclusive OR circuit 37 and the inputs $A_0, A_1, A_2, A_3$ and $A_4$ of the input terminals $I_0, I_1, I_2, I_3$ and $I_4$ respectively to the output terminals $O_1, O_1, O_2, O_3, O_4$ and $O_5$.

Figure 7:
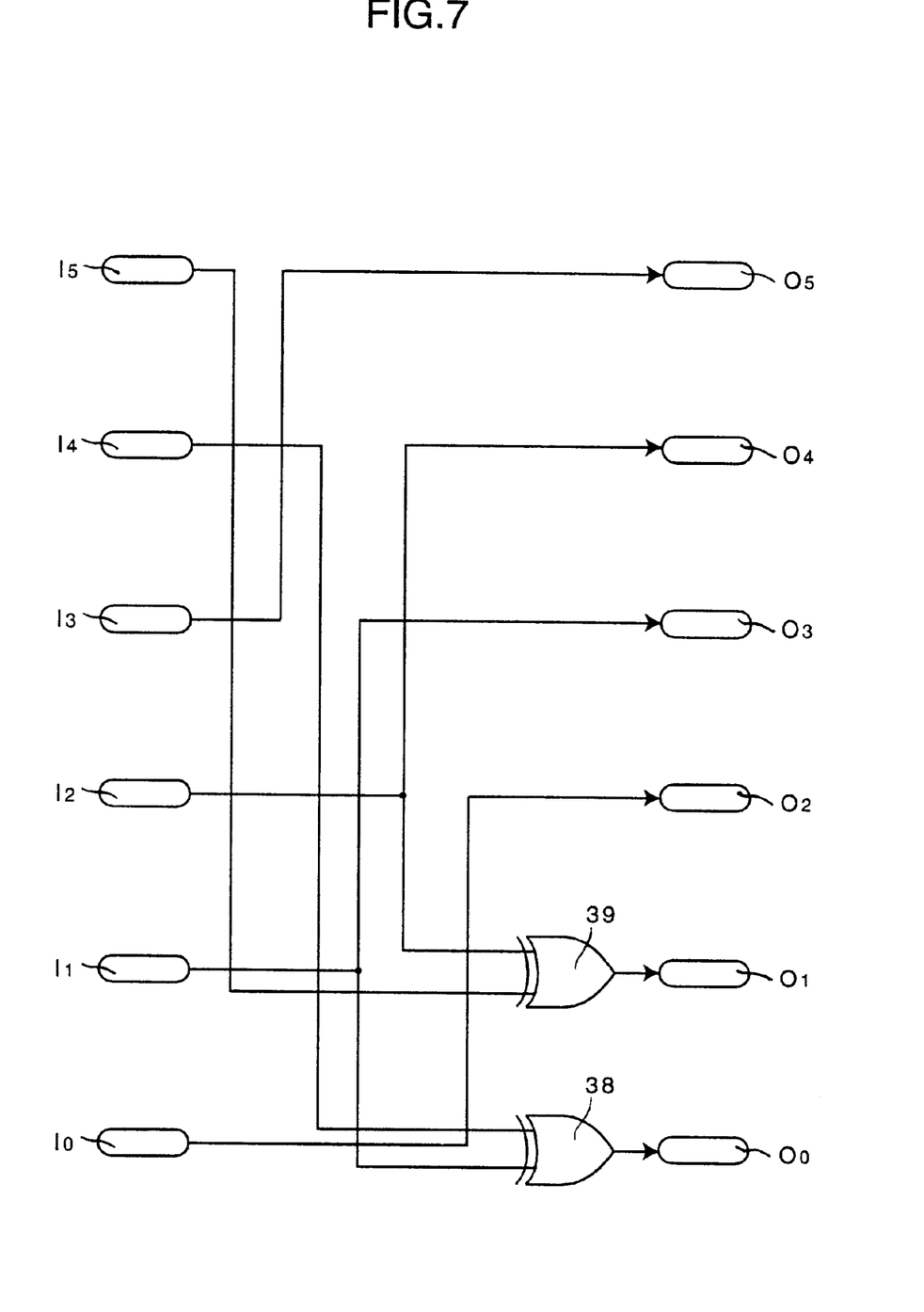
FIG. 7 is a block diagram showing the $2^4$ bit shift circuit.

The $2^4$ bit shift circuit has an exclusive OR circuit 38 for taking an exclusive OR of the input $A_1$ of the input terminal $I_1$ and the input $A_4$ of the input terminal $I_4$, an exclusive OR circuit 39 for taking an exclusive OR of the input $A_2$ of the input terminal $I_2$ and the input $A_5$ of the input terminal $I_5$. The $2^4$ bit sift circuit outputs each of outputs from the exclusive OR circuits 38 and 39 and the inputs $A_0, A_1, A_2,$ and $A_3$ of the input terminals $I_0, I_1, I_2$ and $I_3$ respectively to the output terminals $O_0, O_1, O_2, O_3, O_4$ and $O_5$.

Figure 8:
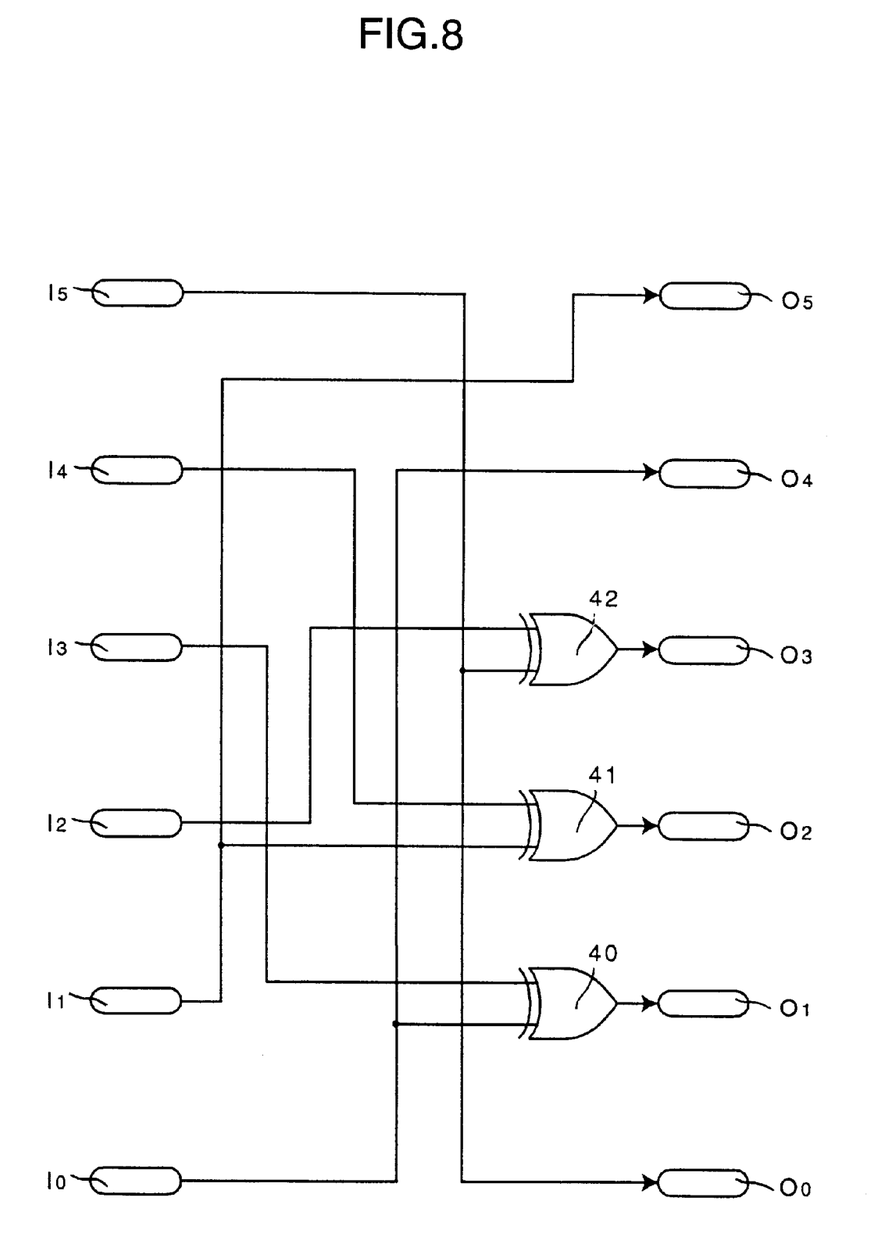
FIG. 8 is a block diagram showing the $2^5$ bit shift inserting circuit.

The $2^5$ bit shift circuit has an exclusive OR circuit 40 for taking an exclusive OR of the input $A_0$ of the input terminal $I_0$ and the input $A_3$ of the input terminal $I_3$, an exclusive OR circuit 41 for taking an exclusive OR of the input $A_1$ of the input terminal $I_1$ and the input $A_4$ of the input terminal $I_4$, and an exclusive OR circuit 42 for taking an exclusive OR of the input $A_2$ of the input terminal $I_2$ and the input $A_5$ of the input terminal $I_5$. The $2^5$ bit sift circuit outputs the inputs $A_5$, each of outputs of the exclusive OR circuits 40, 41 and 42, the input $A_0$ of the input terminal $I_0$, and the input $A_1$ of the input terminal $I_1$, respectively to the output terminals $O_0, O_1, O_2, O_3, O_4$ and $O_5$.

The above-described constitution can easily configured from each value of the power in the matrix A as has been described above.

Even though the six-stage M-sequence has been described above, it is clear that the present invention can apply to another M-sequence having a plurality number of stages more than six stages.

As has been described above, since the present invention can realize a small circuit scale of the circuit that shifts the M-sequence with an arbitrary bit, it is possible to miniaturize the unit, to decrease an electric power consumption, and to reduce a cost.

What is claimed is:

1. A circuit for arbitrarily shifting an M-sequence, comprising:

N stages of shift registers for generating the M-sequence; and a plurality of two to several power bit shift inserting circuits which are connected in series between N bit outputs of each stage of said shift register and a final N bit output.

2. The circuit for arbitrarily shifting the M-sequence, as set forth in claim 1, wherein each of said two to several power bit shift inserting circuits comprises two to several power bit shifting circuit for shifting an input signal of N-bit with two to several power bits so as to output an output signal of N-bit, and a data selector for changing over said input signal of N-bit and said output signal of N-bit corresponding to a control signal supplied from an outside, so as to output an output signal of N-bit thereof.

3. The circuit for arbitrarily shifting the M-sequence, as set forth in claim 1, wherein each of said two to several power bit shift inserting circuits has an N-number of integral from 0 to N−1.

4. The circuit for arbitrarily shifting the M-sequence, as set forth in claim 1, wherein each of said two to several power bit shift inserting circuits having the N-number of integral exponents from 0 to N−1, has necessarily only one exponent.

5. A circuit for arbitrarily shifting an M-sequence, comprising:

a shift register having N stages and for generating an M-sequence of N-bit;

control means for outputting as a control signal, in a case of shifting said M-sequence of N-bit with k bit or bits, a binary number which is converted from said k into a binary number representation; and an N number of two to several power bit shift inserting circuits which are connected in series between N-bit outputs of each stage of said shift registers and final N-bit outputs:

wherein each of said two to several power bit shift inserting circuits has one integral from 0 to N−1 as an exponent of power of two, and wherein each of said two to several power bit shift inserting circuits inputs an input signal corresponding to each of figures in said control signal which is represented by said binary number, shifts said input signal of N-bit with a bit of an exponent power of two when said control signal is 1, and outputs said input signal of N-bit, as it is, when said control signal is 0.

6. The circuit for arbitrarily shifting the M-sequence, as set forth in claim 5, wherein each of said two to several power bit shift inserting circuits comprises:

a two to several power bit shifting circuit for shifting said input signal of N-bit with two to several power bits; and a data selector for changing over said input signal of N-bit and an output signal of n-bit which is outputted from said two to several power bit shifting circuit corresponding to said control signal so as to output an output signal of n-bit.

7. The circuit for arbitrarily shifting the M-sequence, as set forth in claim 6, wherein each of said two to several power bit shift inserting circuits has an exponent of power of two, which is a specific integral from 0 to N−1 for avoiding an interposition.

8. A circuit for arbitrarily shifting an M-sequence, comprising:

N stages shift registers for generating the M-sequence;

an N number of two to several power bit shifting circuits having an exponent of power of two which is any one of integrals from 0 to N−1, for shifting an input of N-bit with bits of power of an exponent of two:

wherein, in a case of shifting said M-sequence of N-bit outputted from said shift register with k bits, a combination of shifting with k bits is selected from said N number of two to several power bit shifting circuits, an N-bit which is outputted from said shift register is inputted to a selected two to several power bit shifting circuit, a bit string of which k bit/bits is/are shifted is outputted.

9. The circuit for arbitrarily shifting the M-sequence, as set forth in claim 8, wherein each of said two to several power bit shift inserting circuits has an exponent of power of two, which is a specific integral from 0 to N−1 for avoiding an interposition.

10. The circuit for arbitrarily shifting the M-sequence, as set forth in claim 8, wherein each of said two to several power bit shift inserting circuits comprises:

a two to several power bit shifting circuit for shifting said input signal of N-bit with two to several power bits; and a data selector for changing over said input signal of N-bit and an output signal of n-bit which is outputted from said two to several power bit shifting circuit corresponding to said control signal so as to output an output signal of n-bit:

wherein said two to several power bit sift inserting circuits are connected in series with one another between an output N-bit of each stage of said sift registers and a final output N-bit, thereby outputting said final output N-bit which is shifted from said output N-bit of each stage of said shift register.

11. A method for shifting an M-sequence of N-bit with k bits, comprising:

a step of generating the M-sequence of N-bit;

a step of selecting a combination which causes said M-sequence of N-bit to be shifted with k bits by shift means for shifting said M-sequence of N-bit with two to zero power bit, two to the first power bits, . . . , and two to the (N−1)-th power bit; and a step of obtaining an M-sequence which is shifted with k bits by inputting an M-sequence of N-bit into said selected shift means and sequentially shifting said M-sequence of N-bit.

12. A method for shifting an M-sequence of N-bit with k bits, comprising:

a step of providing a matrix A which causes said M-sequence of N-bit to be shifted with one bit; and a step of obtaining an M-sequence shifted with k bits by multiplying said M-sequence of N-bit by said matrix A to the k-th power.

13. The method for shifting the M-sequence of N-bit with k bits, as set forth in claim 12, wherein two to zero power, two to the first power, . . . , and two to the (N-1)-th power are provided for said matrix A which shifts said M-sequence of N-bit with one bit; when said M-sequence of N-bit is shifted with k bits, a combination of matrices at shifting with k bits is selected from matrices which are previously provided; and the selected matrix is multiplied to said M-sequence of N-bit, thereby shifting said M-sequence of N-bit with k bits.

* * * * *